Jan. 13, 1970　　　J. M. STOGNER ET AL　　　3,489,394
METHOD AND APPARATUS FOR MIXING A LIQUID CONTAINING SOLID
PARTICLES WITH ANOTHER LIQUID AND FOR FEEDING
THE MIXED LIQUIDS INTO AN OIL WELL
Filed April 12, 1968　　　　　　　　　　　　　　2 Sheets-Sheet 1
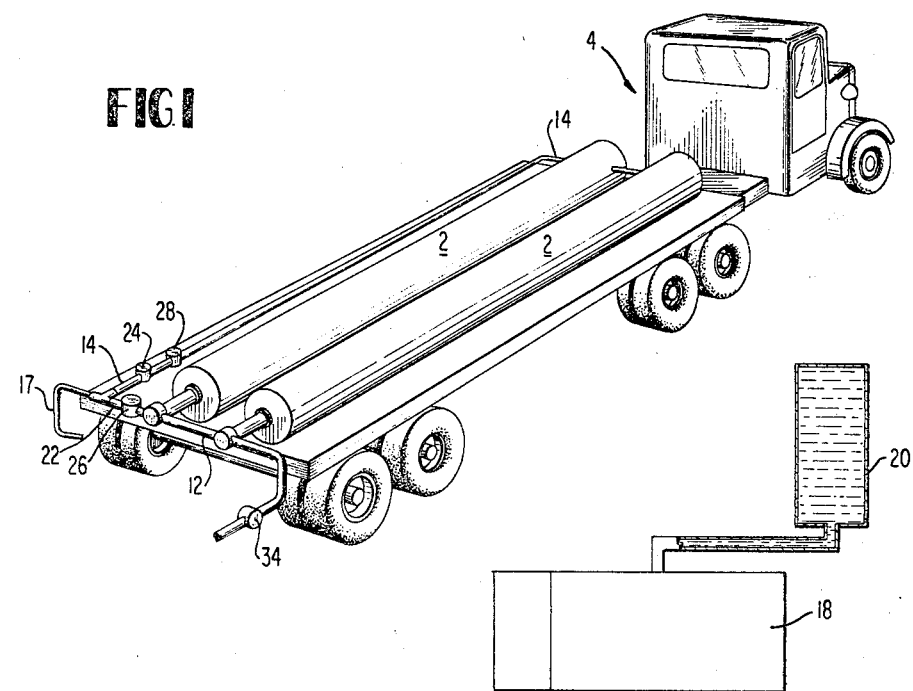
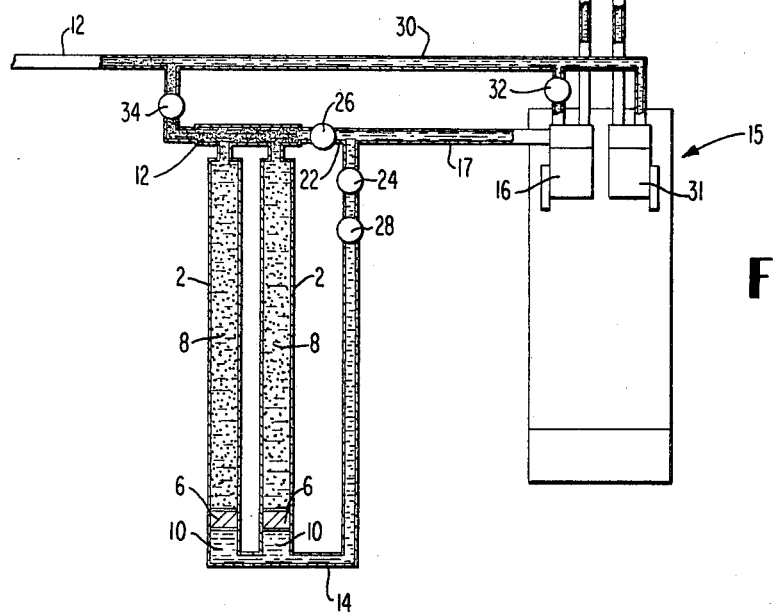
INVENTORS
JOEL M. STOGNER
HAROLD S. LABYER
BY Burns, Doane, Benedict, Swecker & Mathis
ATTORNEYS

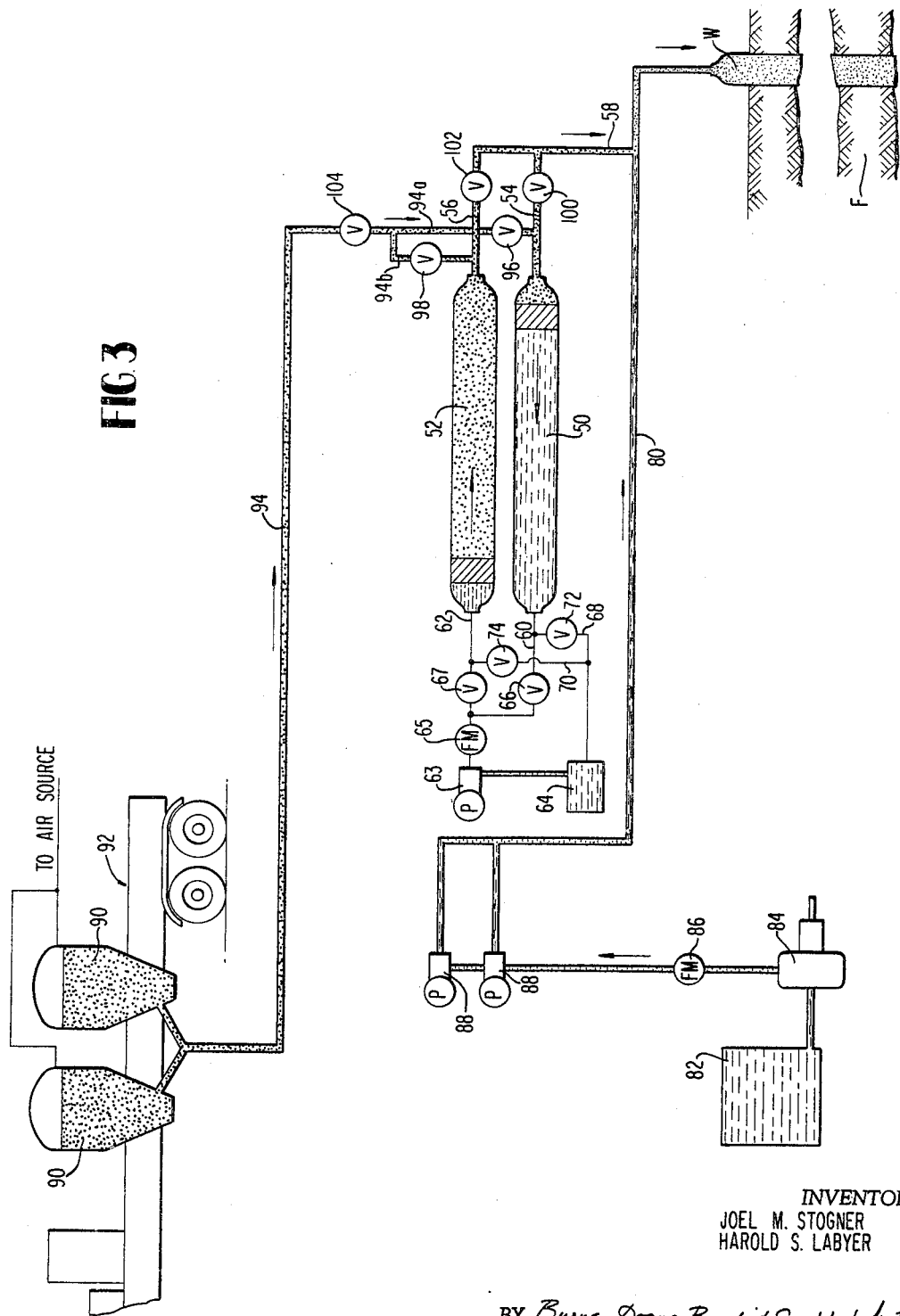

United States Patent Office 3,489,394
Patented Jan. 13, 1970

3,489,394
METHOD AND APPARATUS FOR MIXING A LIQUID CONTAINING SOLID PARTICLES WITH ANOTHER LIQUID AND FOR FEEDING THE MIXED LIQUIDS INTO AN OIL WELL
Joel M. Stogner and Harold S. Labyer, Duncan, Okla., assignors to Halliburton Company, Duncan, Okla., a corporation of Delaware
Filed Apr. 12, 1968, Ser. No. 721,028
Int. Cl. B01f 3/10, 5/10; E21b 33/13
U.S. Cl. 259—4                                          11 Claims

ABSTRACT OF THE DISCLOSURE

A method and apparatus for injecting intermixed liquid and solid material into a system. The apparatus is characterized by a cylinder which contains solid particulate material and liquid, with the solid particulate material being packed at substantially its maximum density in the cylinder. A piston or other displacing means is provided for expelling the particulate material and liquid in a fluid-like condition into a mixing conduit. Liquid flowing through the mixing conduit mixes with the partculate material and liquid displaced from the cylinder. The mixed materials within the mixing conduit are conveyed as a fluid stream from the mixing site to a working site.

BACKGROUND OF THE INVENTION

This invention relates to a method and apparatus for injecting solid particles into a mixing conduit for mixing and conveying with a liquid material. In particular, the invention relates to a method and apparatus utilizing cylinders precharged with a first liquid containing a high concentration of solid particles, wherein the first liquid is expelled and mixed with a second liquid to provide a mixed liquid of a desired solids concentration.

In certain industrial operations, it is necessary to inject particulate solid materials, such as as sand, beads, or rubber balls into a system.

Often the fluid employed to convey the particulate material is under high pressure. However, positive displacement pumps required to generate high conveying pressures are incapable of handling, on a sustained basis, a liquid which carries relatively large particulate materials or a high density of smaller particulate material. Centrifugal pumps which are capable of pumping slurries are not capable of developing the high fluid pressures necessary for a fracturing operation.

Several operations common in oil field practice involve injecting liquid media containing solid particles often of an abrasive nature, into an opening in the earth such as an oil well. The present invention will be described with reference to a fracturing operation but it will be appreciated that the invention is equally suitable for other industrial applications and for many other formation treating operations, such as for example grouting operations, or the injection of non-abrasive solids such as elastomeric particles to close off formation openings.

Frequently operations of this type involve a step of mixing a concentrated, first fluid containing a very high concentraton of solid particles with a second liquid prior to injection into the well, to provide an injection liquid having a suitable concentration of solid particles. In a further step, the injection liquid is pumped into the oil well at high pressure (e.g. 10,000–12,000 p.s.i. may be common).

Hitherto, the steps of mixing the concentrated first liquid with the second liquid and thereafter pumping the injection fluid into the well have frequently been performed utilizing conventional blending and pumping equipment. However, the concentrated first liquid is, by reason of its very high proportion of solid particles, usually so thick as to be almost gel-like (for example, a concentration of ten pounds of sand per gallon of liquid is not uncommon) with the result that, even if it can be pumped at all, serious overloading of the pumps is likely to occur. This difficulty may be compounded in the use of some solid particles sometimes used, such as sand, metal shot or glass balls which are simply too large to be handled by the valving and piston elements of high pressure, fracturing pumps.

Another problem may arise by reason of the very high concentration of abrasive particles described, which tends to rapidly abrade the working parts of the blending and pumping equipment used leading to frequent breakdown of the equipment coupled with high maintenance and replacement costs.

Another drawback of prior equipment has involved reliance on agitation to maintain a uniform distribution to solids during an injection operation.

It would therefore be desrable to obviate these problems by providing equipment in which the liquid could be pumped to high pressures using conventional high pressure pumping equipment without requiring the solid and then often abrasive particles to pass through the high pressure pumps and without requiring agitation.

One previous apparatus for feeding liquid media into an oil well comprised a closed cylinder containing a movable piston. The cylinder was precharged with a quantity of the liquid media which was later expelled under pressure into the oil well by fluid pressure such as steam applied to the piston. Although the prior device may have been suitable for its intended function (injecting liquid fire extinguishing fluids), no provision was made for diluting the expelled liquid prior to entry to the well with the result that the prior system described would not be suitable for injecting a concentrated fracturing fluid containing solid particles requiring mixing with another liquid prior to injection to the well. Most significantly, this fire fighting proposal in no way involves the handling of suspended solid particles and in no way suggests solutions or techniques for solving the high pressure pumping problems previously discussed.

OBJECTS AND SUMMARY OF INVENTION

It is a general object of the invention to provide a method and apparatus which enables a quiescent, confined body of high solids content fluid-like material, to be effectively injected into a system without relying on agitation and without passing the solids through a high pressure pump.

It is a particular object of the invention to provide a method and apparatus for mixing a first liquid containing a high concentration of solid particles with a second liquid to provide an injection fluid of the type used for fracturing, grouting, lost-circulation treating, and like operations, which method and apparatus obviate or minimize problems of the type previously noted.

It is a particular object of the invention to provide a method and apparatus for mixing a first liquid containing a high concentration of particles with a second liquid and for feeding the mixture into a well, which method and apparatus is capable of reliable operation with reduced maintenance and replacement costs.

It is another object of the invention to provide a method and apparatus for injecting liquid containing abrasive solid particles into a well which may function utilizing high pressure pumping equipment but without requiring the abrasive particles to pass through the high pressure pumps.

It is a further object of the invention to provide an apparatus for mixing a first liquid containing a high concentration of solid particles with a second liquid and for feeding the mixed liquids to a well, which apparatus is so constructed that the relative proportions of the liquids in the mixture may be accurately and simply controlled.

The accomplishment of many of the foregoing objects is effected by supporting a quiescent confined body of high solids content, fluid-like, material. This body of quiescent fluid-like material is displaced as a confined body, free of agitation, into mixing conduit means. Means are provided for mixing fluid with the fluid-like material within the mixing conduit means and for conveying these mixed components through the mixing conduit means.

Optimum advantages of the invention are realized where the high solids content material comprises particulate solids confined under a density which approaches the maximum possible solids density.

A method aspect of the invention intended to accomplish some of the foregoing objects provides for mixing a first liquid containing solid particles with a second liquid and for feeding the mixed liquids into a well. The method utilizes at least one closed tubular container provided with movable piston means dividing the container into noncommunicating first and second expansible chambers. The method includes the steps of precharging the first chamber with a quantity of the first liquid and of placing the first chamber in fluid communication with the well through a mixing line. In further steps, the second chamber is placed in fluid communication with a source of fluid under pressure to force the piston means along the container to expel the first liquid into the mixing line. Concurrently, the second liquid is delivered directly to the mixing line to mix with the first liquid prior to entry to the well. In this manner, the concentration of solid particles is diluted to that required to accomplish the particular desired objective of treatment.

In a further method aspect, the step of placing the second chamber in fluid communication with a source of fluid under pressure is achieved by placing the second chamber in fluid communication with a source of the second liquid under pressure. In this way, a single pressure source serves both to empty the container and also to drive the second liquid into the mixing line.

A further method aspect of the invention resides in utlizing at least two of the containers with provision for separately disconnecting each of the containers in turn from the mixing line for concurrent connection to a refill supply of the first liquid under pressure. The method includes the further steps of expelling the first liquid from one of the containers while concurrently refilling the other of the containers with the first fluid from the supply, in alternate sequence.

An apparatus aspect of the invention is intended to mix a first liquid containing solid particles with a second liquid provided from a source thereof under pressure, and to feed the mixed liquids into a well. The apparatus includes at least one closed tubular container having piston means movably mounted in the container for dividing the container into noncommunicating, first and second expansible chambers. The first chamber is initially precharged with a quantity of the first liquid. A mixing line is connected to the container adjacent one end thereof and is adapted to place the first chamber in fluid communication with the well. First conduit means is connected to the container adjacent an opposite end thereof and is adapted to place the second chamber in fluid communication with a source of fluid under pressure to cause the piston to be forced along the container to expel the first liquid into the mixing line. A second conduit means connected with the mixing line is adapted for connection with the source of second liquid under pressure to cause mixing of the liquids in the mixing line prior to entry to the well.

In another apparatus aspect, the source of fluid under pressure for moving the piston comprises the source of the second liquid.

To facilitate accurate proportioning of the mixed liquids, selectively variable first valve means is interposed in the first conduit means for controlling the rate at which the second liquid is admitted to the second chamber to expel the first liquid into the mixing line. Selectively variable second valve means are also interposed in the second conduit means for controlling the rate at which the second liquid is admitted to the mixing line so that the relative proportions of the liquids being mixed may be selectively and accurately varied.

In another embodiment of the invention, the apparatus includes at least two of the closed tubular containers together with a supply source of the first liquid. Each of the containers may be separately disconnected from the mixing line and connected to the supply source for refilling of the container. The two containers are operated in alternate sequence with one of the containers being emptied of first liquid into the mixing line while the other container is concurrently being refilled with first liquid. This arrangement permits substantially continuous injection of mixed liquid into the well.

THE DRAWINGS

A preferred embodiment of the invention is illustrated in the accompanying drawings in which:

FIGURE 1 is a perspective view of two, vehicle-mounted, storage cylinders forming a part of an apparatus constructed in accordance with one preferred embodiment of the invention;

FIGURE 2 is a simplified schematic view of an apparatus for mixing and feeding liquids according to the preferred embodiment of the invention; and FIGURE 3 is a simplified schematic view of another embodiment of the invention.

DETAILED DESCRIPTION

In describing the various embodiments of the invention, reference will be made to a specific industrial application, i.e., a well fracturing operation. However, for purposes of convenience and for general application beyond fracturing operations, the terms "first liquid," "second liquid," and "particulate" or "solid" material, will be employed.

The term "first liquid" as here used, will refer to a composite mixture of particulate materials and solids. For example, in fracturing operations, this first liquid may comprise a mixture of 20–40 mesh Ottawa sand interspersed with a liquid comprising water mixed with guar gum. The liquid material may be fabricated by mixing 125 pounds of guar gum formulation supplied by the Halliburton Company of Duncan, Okla., and designated W.G. #6 water gel, with a thousand gallons of water.

In this first liquid, 30 pounds of sand is interspersed in each gallon of liquid. With this sand, one gallon of liquid would completely fill the voids of 31 pounds of the sand. Thus the solids density, on a space or volume basis, is very nearly the maximum solids density possible, i.e., there is slightly more liquid per inch than that required to completely fill the voids of the sand. In order to obtain optimum benefits of the invention, the solids density of the first liquid should be equal to at least about 85 percent of the maximum density of solids with a given volume.

The term "second liquid" as here employed, refers to solids-free liquids such as fresh water, brine, kerosene, etc. In the fracturing operation, subsequently discussed, the second liquid will be fresh water or brine.

The terms "particulate" material or "solids," as hereinafter used, depending upon the operation involved, may infer materials such as sand, gravel, steel shot, glass beads, elastomeric beads, etc.

Referring to FIGURE 1 of the drawings, a preferred embodiment of the invention, there shown, directed to well fracturing, includes two cylindrical storage containers 2 of relatively large volumetric capacity fixedly mounted on a conventional flat bed truck 4, with the cylinders extending longitudinally rearwardly away from the truck cab. The cylinders are of slender, relatively thick-walled construction to enable them to withstand high internal operating pressures.

Each container 2 (FIGURE 2) includes a sealing, axially sliding piston 6 dividing the container into first and second expansible chambers 8 and 10 extending rearwardly and forwardly respectively on opposite sides of the piston 6. The first chamber of each container 2, which initially comprises the major part of the total container volume, is precharged with a first liquid containing a very high concentration of solid particles.

In the fracturing operation, the first liquid comprises an extremely high proportion of solid particles. In this concentrated form, and with the presence of the guar gum additive, the concentrated first liquid is of so thick and viscous a consistency as to constitute almost a gel. In addition, it is of extremely abrasive nature due to the high concentration of sand.

When the first liquid is of a volatile nature (as in some forms of treatment) an advantage is provided by the use of the closed storage cylinders as they permit storage of the first liquid in ready-to-use condition without significant evaporation losses.

The rearward ends of the containers 2 are connected to a mixing line 12 which at its remote end is in fluid communication with the oil well (not shown) to be treated. The forward ends of the containers 2 are connected to a first conduit 14 communicating with the second chambers 10 and with a source, generally designated 15, of a second liquid. The second liquid is mixed with the concentrated first liquid (as will be described hereinafter) so that an injection fluid having a predetermined concentration of solid particles suitable for fracturing is provided.

In more detail, the source 15 comprises a high pressure, positive displacement pump 16 connected on its delivery side by a pump outlet line 17 to the first conduit 14 and connected on its input side through a conventional proportioning and blending unit 18 to a reservoir 20 of the second liquid. The reservoir 20 contains an ample supply of the second liquid. The second liquid is stored in the reservoir in the manner in which it is initially supplied, i.e. free of additives, and solid materials. Various additives may be added to the second liquid in the blender 18. The second fluid is then withdrawn from the blender and proportioner 18 by the pump 16.

As the second liquid is pumped through the conduit 14, it forces the piston 6 in each container to expel the first liquid from each respective first chamber 8 into the mixing line 12. At the same time, a portion of the second liquid is delivered directly to the mixing line 12 through a second conduit 22 connected to the pump line 17. By controlling the relative flows of the first and second liquids to the mixing line, the concentration of solid formation fracture, propping, sand particles in the resulting liquid mixture can be maintained at any predetermined desired level. This control is effected by adjustable valve mechanisms, subsequently described.

In a very important aspect of the invention, it will be seen that the method of mixing and feeding just described, enables the use of conventional fracturing pumps to obtain the high pressures without at the same time requiring the passage of the solid formation fracture, propping, sand particles through the fracturing pumps. By storing the sand particles in a static or quiescent state in a separate container from which they are expelled by a sliding piston into the clear second liquid already at the desired high pressure, it is possible to inject wells with particulate material having a particle size that could not be accommodated directly to the high pressure fracturing pumps. In addition, the high pressure pumps act only on clear fluid and are not therefore adversely affected by abrasion.

Because of the nearly maximized density of sand with the containers 2, no problems of "settling" or uneven sand distribution are involved.

To facilitate accurate control of the relative amounts of the liquids admitted to the line, a first, selectively adjustable liquid valve 24 is interposed in the first conduit 14 to control the rate at which the second liquid is admitted to the second chambers 10 of the containers, thus controlling the rate at which the first liquid is expelled into the mixing lines 12. Similarly the rate at which the second liquid is admitted to the mixing line 12 is controlled by a second selectively adjustable liquid valve 26 interposed in the second conduit 22. By selective adjustment of the valves 26 and 24 it is possible to regulate both the aggregate quantity of liquids entering the mixing line 12 and also the relative proportions of the two liquids present in the mixture.

A liquid flow meter 28 is also interposed in the first liquid conduit 14 to give an indication of the rate at which second liquid is being supplied to the containers 2, which must of course equal the rate at which the first liquid is being expelled from the containers 2. Similar liquid meters may be interposed in other liquid conduits in any of the other various liquid conduits and flow lines of the apparatus.

Further mixing of an additional proportion of the second liquid to the mixture in line 12 is effected by connection of a third liquid conduit 30 extending between the pump 16 and the mixing line 12. The third conduit 30 is connected to the mixing line 12 at a point downstream of the point at which the first mixing occurred. A second liquid pump 31 similar to the first liquid pump 16 in parallel therewith is connected between the blender unit 18 and the third conduit 30 to deliver liquid thereto.

A third, selectively adjustable flow valve 32 is interposed in the third conduit 30 for selectively controlling the flow of liquid therealong. Similarly, a fourth, selectively adjustable flow control valve 34 is interposed in the mixing line upstream of the point of connection thereto of the third conduit 30 and downstream of the point at which the first mixing occurred. By selective adjustment of the third and fourth flow control valves 32 and 26, respectively, the proportion of second liquid added to the already mixed liquids can be controlled to maintain a desired concentration of solid particles in the injection fluid actually entering the well.

It will be appreciated that the mixing of the two liquids in the manner described occurs in two stages, the first stage being between the first liquid and the second liquid admitted through the second conduit, and the second stage being between the mixed liquids and the additional amount of second liquid admitted through the third conduit.

Although it is possible to provide for mixing the two liquids in only a single stage, it has been found advantageous to provide for mixing in the two stages described as this arrangement permits conduits and associated structure of smaller dimension to be provided on the mobile transport vehicle 4.

Detachable connections (not shown) are interposed in the third fluid conduit 30 and in the pump line 17 to permit separation of the storage containers 2 mounted on the vehicle 4 from the pumps 16 and other associated equipment not mounted on the vehicle. This permits the storage containers 2 to be driven away when emptied so that fresh, filled containers mounted on another vehicle may be connected in, in turn. Additionally, filled containers could be stored at a work site and connected into the system when required.

An alternative embodiment of the invention, shown in FIGURE 3, provides two storage containers 50 and 52 which may be refilled with the first liquid and discharged in alternate sequence to provide a substantially constant flow of mixed liquids into the well. The containers 50 and 52 are similar to the containers 2 previously described. As before, each container includes a sliding piston dividing the container into an expansible first chamber on one side of the piston containing the high density solid content, first liquid, and a second chamber on the other side of the piston.

The containers 50 and 52, at one end, are connected to liquid conducting, connecting lines 54 and 56, respectively, which place the first chambers of each of the containers 50 and 52 in fluid communication with a mixing line 58. The mixing line 58 is connected at its remote end to the oil well. At their other ends, the containers 50 and 52 are connected by first and second conduits 60 and 62, respectively, to a pump 63 which delivers water under pressure from a reservoir 64. A liquid flow meter 65 is interposed in the output of the pump 63.

First and second control valves 66 and 67 are interposed in the first and second conduits 60 and 62, respectively, to separately control the admission of water from the pump 63 under pressure, into each of the second chambers of the containers 50 and 52. Such controlled admission of water to the respective second chambers of the two containers effects corresponding expulsion of the first liquid from the containers into the mixing line 58.

The exhausting of water from the second chambers of the containers 50 and 52, during recharging operations, is effected through first and second exhaust conduits 68 and 70 connected between the reservoir 64 and the first and second conduits 60 and 62, respectively. The exhaust conduits 68 and 70 are provided with control valves 72 and 74, respectively, for controlling the passage of liquid.

Suitable and conventional control apparatus for the valves (not shown) is operated in such a manner as to ensure that the containers 50 and 52 are operated in alternate sequence with water being admitted to the second chamber of one of the containers at the same time that the first liquid is being exhausted from the second chamber of the other of the containers.

To facilitate mixing of second liquid with the first liquid being displaced into the mixing line 58, a third conduit 80, communicating with the mixing line 58, is provided. Second liquid is supplied to the third conduit 80 from a reservoir 82 of the second liquid, through a centrifugal pump 84, a flow meter 86, and two conventional, high pressure developing, positive displacement fracturing pumps 88 connected in parallel.

To enable refilling of the containers 50 and 52 in alternate sequence, a supply of the high solids content, first liquid is provided. The supply includes two hoppers 90 mounted on a suitable vehicle 92 and containing quantities of the first liquid under substantial air pressure. The hoppers 90 are both connected to a fourth liquid conducting conduit 94. Conduit 94 is connected at its remote end through valved branch conduits 94a and 94b, to the previously mentioned connecting lines 54 and 56. Selectively operable valves 96 and 98 are interposed in the branch conduits 94a and 94b, respectively, to control the flow of liquid therethrough.

Additional manual shutoff valves 100, 102 and 104 are provided in the first and second connecting lines 54 and 56 and in the fourth conduit 94 for closing off liquid flow therein when the equipment is in an inactive condition.

As will be appreciated, while the first liquid is being injected into cylinder 50 for recharging purposes, this first liquid may be in the process of being discharged from the cylinder 52 for injection into the mixing conduit 58 and ultimate transmittal through the well W to the subterranean formation F.

As will be appreciated, the illustration of the well W and formation F in FIGURE 3 has been vastly simplified. A conventional well operation would entail the use of injecting tubing, packing means to isolate the subterranean formation, etc. Since such fracturing apparatus is well known, its illustration here has been avoided so as not to obscure the present invention.

In order to appreciate the disposition of the various valve components of the system during various phases of the operation, reference to the following tabulation may be made where "O" indicates an open valve and "X" indicates a closed valve:

| | Disposition of System Valves | | | | | | | | |
|---|---|---|---|---|---|---|---|---|---|
| | 66 | 67 | 72 | 74 | 96 | 98 | 100 | 102 | 104 |
| Injection from cylinder 52 and recharging of cylinder 50 | X | O | O | X | O | X | X | O | O |
| Injection from cylinder 50 and recharging of cylinder 52 | O | X | X | O | X | O | O | X | O |
| System closed down (Pumps stopped) | X | X | X | X | X | X | X | X | X |

SUMMARY OF ADVANTAGES

In the preceding discussion, reference has been made to a system for injecting particulate solid materials into a subterranean formation through a well. This area of uitlization of the invention suggests other areas. For example, the invention may be employed to inject solid materials into formations lying at ground surface.

It is equally obvious that in a variety of industrial operations, where solid materials are to be injected into a system, the invention would have utility.

The broad area of applicability of the invention notwithstanding, maximum advantages are derived from field operations such as those encountered in the treatment of wells. It is here that the simplicity and the reliability of the invention are uniquely advantageous and enable high solids content slurries to be injected, without agitation, into a mixing conduit for transportation under extremely high fluid pressures to a subterranean formation.

In particular, the invention enables injection fluid containing solid particles to be injected at high pressure into a formation utilizing high pressure fracturing pumps without requiring the particles to be passed through the high pressure pumps. One important advantage provided by this is reduced pump wear. Another equally important advantage is the ability to inject particles of a size too large to pass through the pumps directly.

Further, wear problems involved in mixing a thick, highly abrasive first liquid with the second liquid are minimized by utilizing a pressure responsive piston to expel a precharged quantity of the first liquid from the tubular containers into a mixing line supplied with the second liquid.

Additionally, the provision of a single pressure source both to move the piston to expel the first fluid and also to force the second liquid into the mixing line, reduces the amount of pumping equipment necessary.

Also significant is the provision of separate control valves for separately controlling the rate at which the second liquid is fed into the mixing line and the rate at which the second liquid is forced into the containers to expel the first liquid. The provision of these separate valves provides for accurate control both of the relative proportions of the mixed liquids and of the aggregate amount of mixed liquid.

Other advantages are provided by the second embodiment of the invention utilizing two containers which are filled and emptied in alternate sequence. This arrangement permits a virtually uninterrupted supply of injection fluid mixed to the correct concentration, to be continuously delivered to a formation.

At this point, the phenomena explaining the unexpected results of the invention are not completely understood. It is believed, for example, that it may be desirable to provide sufficient liquid in the "first liquid" so as to maintain a fluid interface between the particles. With this interface, and with the maintenance of the pressure of the displacing fluid being properly controlled, displacement may be effected without inducing the "bridging" or locking together of the solids within the cylinder.

As will be appreciated, the "first liquid," in exciting from a storage cylinder, will flow through a constricted zone and thus be ostensibly vulnerable to a bridging tendency. This bridging tendency would result from mechanically pressing the particles together as they move through a constricted zone so as to rupture a fluid film within the particles and bring them into direct frictional contact. The maintenance of displacement pressures below that where such bridging would occur may be empirically determined for any given system.

While bridging pressures are to be avoided, it is indeed surprising that the displacement of the quiescent, high solids content, slurries from these storage cylinders may be effected at any pressures without encountering bridging tendencies. With solids such as sand, the use of a friction reducing additive in the first liquid probably minimizes bridging tendencies. However, it is surprising to find that, even with such an additive, bridging may be avoided with nearly a maximum solids content in the first liquid.

Although certain preferred embodiments of the invention have been described, it will be appreciated by those skilled in the art that numerous additions, deletions, substitutions, modifications and other changes not specifically shown or described may be made.

We claim:

1. A method of mixing a first liquid containing solid particles with a second liquid and of feeding the mixed liquids into a formation, the method utilizing at least two closed tubular containers, each provided with movable piston means dividing the container into noncommunicating, first and second expansible chambers, with said tubular containers being provided with means for separately disconnecting the containers from a mixing line and connecting the containers to a supply of the first liquid under pressure for refilling, the method comprising the steps of:
    precharging the first chamber of one of said containers with a quantity of the first liquid;
    placing the second chamber of said one of said contain- in fluid communication with the formation through the mixing line;
    placing the second chamber of said one of said containers in fluid communication with a source of fluid under pressure to force the piston means thereof along the container to expel the first liquid into the mixing line while concurrently charging the first chamber of the other of said containers with first liquid from a supply thereof;
    delivering the second liquid directly to the mixing line to mix with the first liquid expelled from said one of said containers prior to entry to the formation;
    placing the first chamber of said other of said containers in fluid communication with the formation through said mixing line;
    placing the second chamber of said other of said containers in fluid communication with a source of fluid under pressure to force the piston means thereof along the container to expel the first liquid into the mixing line while concurrently charging the first chamber of said one of said containers with first liquid from a supply thereof; and
    delivering said second liquid directly to the mixing line to mix with the first liquid expelled from said other of said containers prior to entry to the formation.

2. A method of delivering injection liquid containing solid particles into a formation under high pressure, the method utilizing at least one closed tubular container provided with movable piston means dividing the container into non-communicating, first and second expansible chambers, the method comprising the steps of,
    precharging the first chamber with a precharged quantity of a first liquid containing a quantity of the solid particles;
    placing the first chamber in fluid communication with the formation through a mixing line;
    delivering a second liquid relatively free of solid particles to the mixing line under high pressure; and
    concurrently forcing the piston means along the container to expel the precharged quantity of first liquid containing the solid particles at substantially the same high pressure into the mixing line;
        said precharging of said first chamber including the positioning in said first chamber of a relatively high viscosity first liquid containing a high concentration of particulate solid material;
        said delivering of second liquid relatively free of solid particles including the delivery of a second liquid having a viscosity less than the viscosity of said first liquid; and
        said expelling of said first liquid being effected over an expelling path defined by said tubular container and having an at least partially horizontal flow direction component.

3. A method of delivering injection liquid as defined in claim 2 wherein the step of forcing the piston means includes,
    diverting a portion of said liquid relatively free of solid particles from delivery to said mixing line; and
    directing said diverted liquid against said piston means to cause said forcing of said piston means along the container.

4. A method of delivering injection liquid containing solid particles into a formation, the method comprising the steps of
    storing a first liquid containing solid particles in a horizontal elongate container with the first liquid being of generally uniform consistency and with a substantially uniform concentration of solid particles per unit length of the container;
    moving the stored first liquid, including said solid particles as a body substantially without agitation generally horizontally and lengthwise of the container at a uniform rate to expel the first liquid uniformly from the container,
    mixing a high pressure second liquid, relatively free of particles, with the first liquid, including said solid particles expelled from the container at a constant rate, and
    feeding the mixed liquids into a formation;
        said storing of said first liquid including the positioning in said container of a relatively high viscosity first liquid containing a high concentration of said solid particles; and
        said second liquid having a viscosity less than the viscosity of said first liquid.

5. An apparatus for mixing a first liquid containing solid particles with a second high-pressure liquid, the apparatus being further adapted to feed the mixed liquids into a formation, said apparatus comprising:
    at least one closed tubular container,
    piston means movably mounted within said container for dividing said container into non-communicating first and second expansible chambers, said first chamber being initially precharged with a quantity of the first liquid,
    a mixing line connected to said container adjacent one end thereof, said mixing line adapted to place said first chamber in fluid communication with a formation,
    first conduit means connected to said container adjacent an opposite end thereof, said first conduit means adapted to place said second chamber in fluid communication with a source of fluid under pressure to cause said piston means to be moved along said container to expel the first liquid into said mixing line;
    second conduit means connected with said mixing line and adapted for connection with the source of second liquid under pressure to cause mixing of the second liquid with the first liquid in said mixing line prior to entry to said formation; and
    third conduit means connected with said mixing line at a point downstream of the point of connection of said second conduit means with said mixing line to cause mixing of an additional portion of the second liquid with the first liquid prior to entry to said formation.

6. An apparatus as defined in claim 5 further including,
selectively variable third valve means interposed in said third conduit for selectively varying the flow of liquid therealong; and
selectively variable fourth valve means interposed in said mixing line intermediate the points of connection thereto of said second and third conduits for controlling the flow of liquid.

7. An apparatus for mixing a first liquid containing solid particles with a second high-pressure liquid, the apparatus being further adapted to feed the mixed liquids into a formation, said apparatus comprising:
at least one closed tubular container,
piston means movably mounted within said container for dividing said container into non-communicating first and second expansible chambers, said first chamber being initially precharged with a quantity of the first liquid,
a mixing line connected to said container adjacent one end thereof, said mixing line adapted to place said first chamber in fluid communication with a formation,
first conduit means connected to said container adjacent an opposite end thereof, said first conduit means adapted to place said second chamber in fluid communication with a source of fluid under pressure to cause said piston means to be moved along said container to expel the first liquid into said mixing line;
second conduit means connected with said mixing line and adapted for connection with the source of second liquid under pressure to cause mixing of the second liquid with the first liquid in said mixing line prior to entry to said formation;
selectively variable third valve means interposed in said third conduit for selectively varying the flow of liquid therealong; and
selectively variable fourth valve means interposed in said mixing line intermediate the points of connection thereto of said second and third conduits for controlling the flow of liquid.

8. An apparatus for mixing a first liquid containing solid particles with a second liquid utilizing independent pressurized sources of supply of the first and second liquids, the apparatus adapted for feeding the mixed liquids into a formation, said apparatus comprising,
at least two closed tubular containers, each said container including,
piston means movably mounted with said container for dividing said container into non-communicating first and second expansible chambers, at least one of said first chambers being initially filled with a quantity of the first liquid;
a mixing line adapted to be connected with a formation,
first and second connecting lines connected with said first and second containers respectively for placing said respective first chambers thereof in fluid communication with said mixing line,
first and second conduit means connected with said first and second containers respectively adapted to place said respective second chambers thereof in alternate fluid communication with a source of fluid under pressure to expel the first liquid from each of said containers alternately,
third conduit means connected with said mixing line and adapted to be connected to the source of second liquid under pressure to cause mixing of the first fluid with the second fluid in said mixing line prior to entry to said formation, and
fourth conduit means adapted to connect said first and second connecting lines with the source of the first liquid to refill said respective first chambers of said containers in opposite alternate sequence.

9. A method of injecting intermixed fluids and solid material into a well, said method comprising:
preparing a composite material including solid particulate material, a liquid, and a friction reducing agent with the density of particulate material being equal to at least about 85 percent of the maximum density of particulate material within the composite material;
supporting a quiescent, confined body of said composite, liquid, friction reducing agent and solid material, above a horizontally extending wall means, with the distribution of solid material being substantially uniform horizontally along said wall means;
displacing said body of quiescent material as a confined body, free of agitation, generally horizontally along said wall means through a relatively restricted outlet, and into mixing conduit means;
maintaining said particulate material, during said displacing, in a substantially fluid-like condition, with the displacing force being maintained below the level operable to cause bridging of said particulate material;
mixing additional liquid material with said composite material in said mixing conduit means; and
conveying said mixed additional liquid material and composite material to a well interior.

10. A method of injecting intermixed fluids and solid material into a formation, said method comprising:
supporting a quiescent, confined body of composite fluid and solid material above a horizontally extending wall means, with the distribution of solid material being substantially uniform horizontally along said wall means;
displacing said body of quiescent fluid and solid as a confined body, free of agitation, horizontally along said wall means and into mixing conduit means;
mixing additional fluid material with said composite material in said mixing conduit means; and
conveying said mixed additional fluid material and composite material to a well interior.

11. A method of injecting intermixed fluids and solid material into a system, said method comprising:
supporting a quiescent, confined body of high solids content, fluid-like material;
displacing said body of quiescent fluid-like material as a confined body, free of agitation, into mixing conduit means;
mixing a second fluid with said fluid-like material in said mixing conduit means; and
conveying said mixed fluid and fluid-like material through said mixing conduit means;
said supporting of said fluid-like material including the positioning in a chamber of a relatively high viscosity first liquid containing a high concentration of particulate solid material;
said second liquid having a viscosity less than the viscosity of said first liquid; and
said displacing of said first liquid being effected over an expelling path defined by said chamber and having an at least partially horizontal flow direction component.

References Cited

UNITED STATES PATENTS

| | | | |
|---|---|---|---|
| 2,072,124 | 3/1937 | Newman | 137—564.5 |
| 2,323,618 | 7/1943 | Ottoson | 137—564.5 |
| 2,453,465 | 7/1948 | Sloan | 259—4 |

ROBERT W. JENKINS, Primary Examiner

U.S. Cl. X.R.

259—153